United States Patent
Kreft et al.

(10) Patent No.: US 9,110,690 B2
(45) Date of Patent: Aug. 18, 2015

(54) SYSTEMS, METHODS, AND APPARATUS FOR DEPLOYING APPLICATION CODE CHANGE CONFIGURATIONS FOR MULTIPLE TARGET CONTROLLERS

(75) Inventors: Dana Robert Kreft, Salem, VA (US); Patrick Joseph Conroy, Salem, VA (US); Andre Steven DeMaurice, Salem, VA (US)

(73) Assignee: General Electric Company, Schenectady, NY (US)

( * ) Notice: Subject to any disclaimer, the term of this patent is extended or adjusted under 35 U.S.C. 154(b) by 642 days.

(21) Appl. No.: 12/769,159

(22) Filed: Apr. 28, 2010

(65) Prior Publication Data
US 2011/0271266 A1 Nov. 3, 2011

(51) Int. Cl.
G06F 9/45 (2006.01)
G06F 9/445 (2006.01)

(52) U.S. Cl.
CPC .................................. G06F 9/44505 (2013.01)

(58) Field of Classification Search
None
See application file for complete search history.

(56) References Cited

U.S. PATENT DOCUMENTS

| | | | |
|---|---|---|---|
| 5,594,858 A | 1/1997 | Blevins | |
| 6,112,181 A * | 8/2000 | Shear et al. | 705/7.29 |
| 6,341,321 B1 * | 1/2002 | Glassen et al. | 710/104 |
| 6,405,364 B1 * | 6/2002 | Bowman-Amuah | 717/101 |
| 6,532,588 B1 * | 3/2003 | Porter | 717/170 |
| 6,678,888 B1 * | 1/2004 | Sakanishi | 717/172 |
| 6,701,441 B1 * | 3/2004 | Balasubramaniam et al. | 726/25 |
| 6,745,224 B1 * | 6/2004 | D'Souza et al. | 709/202 |
| 6,986,148 B2 * | 1/2006 | Johnson et al. | 719/332 |
| 7,146,610 B2 * | 12/2006 | Shen | 717/170 |
| 7,203,937 B1 * | 4/2007 | Kyle et al. | 717/168 |
| 7,509,636 B2 * | 3/2009 | McGuire et al. | 717/168 |
| 7,533,377 B2 * | 5/2009 | Appavoo et al. | 717/168 |
| 7,589,625 B2 * | 9/2009 | Vicente et al. | 340/506 |
| 7,614,046 B2 * | 11/2009 | Daniels et al. | 717/170 |
| 7,680,515 B2 * | 3/2010 | Cho et al. | 455/561 |
| 7,734,574 B2 * | 6/2010 | Dang et al. | 1/1 |
| 7,769,990 B1 * | 8/2010 | Okcu et al. | 713/1 |
| 7,809,756 B2 * | 10/2010 | Barney et al. | 717/170 |
| 7,818,736 B2 * | 10/2010 | Appavoo et al. | 717/168 |

(Continued)

FOREIGN PATENT DOCUMENTS

JP 2003-150210 A 5/2003

OTHER PUBLICATIONS

Yu, et al., "A Framework for Live Software Upgrade"; 2002 IEEE; [retrieved on Oct. 25, 2012]; Retrieved from Internet <http://ieeexplore.ieee.org/stamp/stamp.jsp?tp=&arnumber=1173236>;pp. 1-10.*

(Continued)

Primary Examiner — Xi D Chen
(74) Attorney, Agent, or Firm — Sutherland Asbill & Brennan LLP

(57) ABSTRACT

Certain embodiments of the invention may include systems and methods for deploying application code change configurations for multiple target controllers. According to an example embodiment of the invention, a method is provided for updating configurations associated with one or more controllers. The method can include updating one or more library user blocks, associating corresponding user block instances with the one or more library user blocks, and modifying one or more application code configurations associated with the one or more controllers based at least in part on the association.

12 Claims, 6 Drawing Sheets

(56) References Cited

U.S. PATENT DOCUMENTS

| | | | |
|---|---|---|---|
| 7,873,959 B2* | 1/2011 | Zhu et al. | 717/170 |
| 7,890,925 B1* | 2/2011 | Wyatt et al. | 717/168 |
| 8,037,469 B2* | 10/2011 | Newman et al. | 717/169 |
| 8,090,943 B1* | 1/2012 | Tran | 713/167 |
| 8,245,218 B2* | 8/2012 | Giambalvo et al. | 717/172 |
| 8,443,354 B1* | 5/2013 | Satish et al. | 717/170 |
| 8,612,516 B2* | 12/2013 | Mallur et al. | 717/170 |
| 8,635,309 B2* | 1/2014 | Berthiaume et al. | 717/168 |
| 2003/0110253 A1* | 6/2003 | Anuszczyk et al. | 709/224 |
| 2003/0126592 A1* | 7/2003 | Mishra et al. | 717/176 |
| 2003/0135660 A1* | 7/2003 | Mortazavi | 709/315 |
| 2005/0021977 A1* | 1/2005 | Oberst | 713/182 |
| 2005/0210459 A1* | 9/2005 | Henderson et al. | 717/168 |
| 2005/0210465 A1* | 9/2005 | Sasaki et al. | 717/169 |
| 2006/0026304 A1* | 2/2006 | Price | 710/8 |
| 2006/0288342 A1* | 12/2006 | Hatlelid et al. | 717/168 |
| 2008/0184218 A1* | 7/2008 | Largman et al. | 717/168 |
| 2008/0189679 A1* | 8/2008 | Rodriguez et al. | 717/105 |
| 2009/0094601 A1* | 4/2009 | Vstovskiy et al. | 717/177 |
| 2009/0125129 A1* | 5/2009 | Eldridge et al. | 700/86 |
| 2010/0023936 A1* | 1/2010 | Fujita | 717/168 |
| 2010/0037215 A1* | 2/2010 | Meiss et al. | 717/168 |
| 2010/0306008 A1* | 12/2010 | Grebenik et al. | 705/8 |
| 2012/0054729 A1* | 3/2012 | Sobel et al. | 717/169 |
| 2013/0227539 A1* | 8/2013 | D'Aurelio et al. | 717/169 |
| 2014/0109075 A1* | 4/2014 | Hoffman et al. | 717/169 |

OTHER PUBLICATIONS

Barr, Eisenbach, "Safe Upgrading without Restarting", 2003 IEEE; [retrieved on Oct. 26, 2012]; Retrieved from Internet <http://ieeexplore.ieee.org/stamp/stamp.jsp?tp=&arnumber=1235414>;pp. 1-9.*

Motiee, et al., "Do Windows Users Follow the Principle of Least Privilege: Investigating User Account Control Practices"; 2010 ACM; [retrieved on Mar. 11, 2015]; Retrieved from Internet <URL:http://dl.acm.org/citation.cfm?id=1837110.1837112>; pp. 1-13.*

D'Angelo, et al., "Content Cloaking Preserving Privacy with Google Docs and other Web Applications"; 2010, ACM; [retrieved on Mar. 11, 2015]; Retrieved from Internet <URL:http://dl.acm.org/citation.cfm?id=1774088.1774259>; pp. 826-830.*

Takahashi, et al., "Customized Program Protection for a User Customized Data Protection Framework"; 2011, IEEE; [retrieved on Mar. 11, 2015]; Retrieved from Internet <URL:http://ieeexplore.ieee.org/stamp/stamp.jsp?tp=&arnumber=5953301>; pp. 643-649.*

Yeager, "Enterprise Strength Security on a JXTA P2P Network", 2003, IEEE; [retrieved on Mar. 11, 2015]; Retrieved from Internet <URL:http://ieeexplore.ieee.org/stamp/stamp.jsp?tp=&arnumber=1231494>; pp. 1-2.*

Notice of Preliminary Rejection dated Feb. 24, 2015 for Japanese Patent Application No. 2011-097983.

* cited by examiner

SYSTEMS, METHODS, AND APPARATUS FOR DEPLOYING APPLICATION CODE CHANGE CONFIGURATIONS FOR MULTIPLE TARGET CONTROLLERS

FIELD OF THE INVENTION

This invention generally relates to application code, and in particular, to deploying application code change configurations for multiple target controllers.

BACKGROUND OF THE INVENTION

Personnel often need to control complex distributed systems that include computer hardware, firmware, and software in conjunction with other special machinery. Some systems have multiple instances of computer controllers, and each of the multiple controllers may run application code, or portions of application code that that may be common to application code that is run on the other related controllers. Updating application code in such systems can be an extremely complex and difficult task.

For instance, renewable energy farms can have tens or hundreds of separate energy harvesting devices distributed over a wide area, and each of these devices may have dedicated controllers to optimize energy conversion and/or coordinate energy production with the other energy harvesting devices, for example. In some cases, personnel may need to physically go to each controller location to update software or firmware. Even if the controllers are accessible via a network, the task of keeping track of multiple classes of code libraries or controllers and appropriately updating the application code in the multiple instances and can prove challenging and time consuming.

BRIEF SUMMARY OF THE INVENTION

Some or all of the above needs may be addressed by certain embodiments of the invention. Certain embodiments of the invention may include systems, methods, and apparatus for deploying application code change configurations for multiple target controllers.

According to an example embodiment of the invention, a method is provided for updating configurations associated with one or more controllers. The method can include updating one or more library user blocks, associating corresponding user block instances with the one or more library user blocks, and modifying one or more application code configurations associated with the one or more controllers based at least in part on the association.

According to another example embodiment, a system is provided for updating configurations. The system includes one or more controllers, at least one memory for storing data and computer-executable instructions, and at least one processor configured to execute the stored computer-executable instructions for updating one or more library user blocks, associating corresponding user block instances in the one or more controllers with the one or more library user blocks, and modifying one or more application code configurations associated with the one or more controllers based at least in part on the association.

According to another example embodiment, an apparatus is provide for updating configurations associated with one or more controllers. The apparatus includes at least one memory for storing computer-executable instructions, and at least one processor. The processor may be configured to access the at least one memory and may be further configured to execute the computer-executable instructions for updating one or more library user blocks, associating corresponding user block instances in the one or more controllers with the one or more library user blocks, and modifying one or more application code configurations associated with the one or more controllers based at least in part on the association.

Other embodiments and aspects of the invention are described in detail herein and are considered a part of the claimed inventions. Other embodiments and aspects can be understood with reference to the following detailed description, accompanying drawings, and claims.

BRIEF DESCRIPTION OF THE FIGURES

Reference will now be made to the accompanying tables and drawings, which are not necessarily drawn to scale, and wherein.

DETAILED DESCRIPTION OF THE INVENTION

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Certain embodiments of the invention may enable deploying application code change configurations for multiple targets such as controllers. Accordingly, certain example aspects of the invention may enable users to initiate and push application code and/or user block definition changes from a code library to one or more controllers. Certain embodiments of the invention may allow users to instance a change in a user block definition directly from the library to all the controllers in one operation.

Various computer systems, configured with special purpose modules for deploying application code change configurations, according to example embodiments of the invention, will now be described with reference to the accompanying figures.

Figure 1:
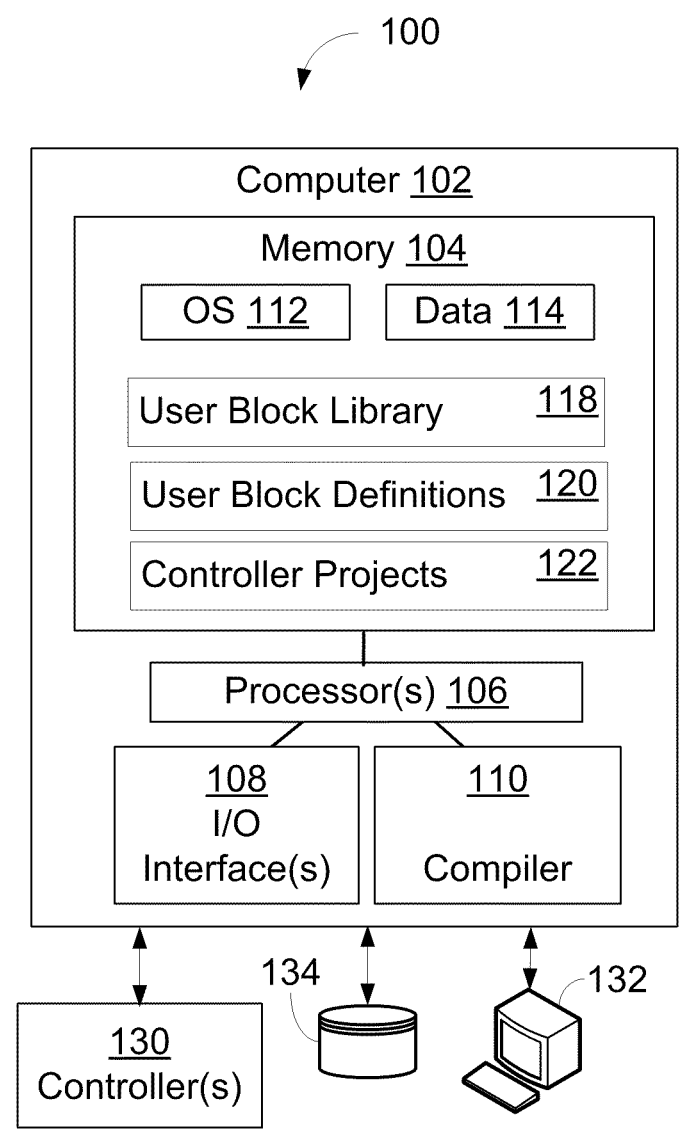
FIG. 1 is a block diagram of an illustrative code change configuration system, according to an example embodiment of the invention.

FIG. 1 illustrates an example configuration system 100, according to an example embodiment of the invention. The configuration system 100 may include a computer 102. The computer may include a memory 104, one or more processors, 106, and one or more input/output devices 108. According to certain example embodiments, the computer 102 may include a compiler 110 for translating human readable code into machine-readable code for deploying to one or more controllers 130. In example embodiment of the invention, the computer 102 may be operable to receive and display information on a user interface 132. In example embodiment of the invention, the computer 102 may be operable to send and retrieve information to a database 134.

In accordance with example embodiments of the invention, the memory 104 may include an operating system 112 and data 114. According to example embodiments of the invention, special purpose modules may also reside in memory 104, and may be configured, programmed, and/or operable to perform functions associated with application code changes. For example, and according to an embodiment of the invention, the memory 104 may include a user block library 118. The user block library 118 may be used, for example, to contain and organize any number of blocks of application code. The memory may also include user block definitions 120. According to example embodiments of the invention, the user block definitions 120 may include links and/or specifications relating the various blocks or sections of application code in the user block library 118 to the aggregate software and firmware, for example, which may run on individual controllers 130.

According to example embodiments of the invention, the memory 104 may include one or more controller projects modules 122. In example embodiments, controller projects modules 122 can be utilized, for example, to maintain a list of controllers 130 that utilize instances of particular application code blocks. According to example embodiments of the invention, the controller projects module 122 may also include information that may specify which blocks of common or unique application code can be updated in a general update process, and which blocks of application code should be protected, via a password for example, from inadvertent changes during application code updates.

According to example embodiments of the invention, the user block library 118, the user block definitions 120, and the controller projects 122 may, separately or in combination, provide a smart search and update function that can enable an operator to, for example, search all user block libraries 118 and controller projects 122 to find where a particular instance of application code is used, and furthermore, to determine if the particular instance of application code is okay to be automatically updated.

Figure 2:
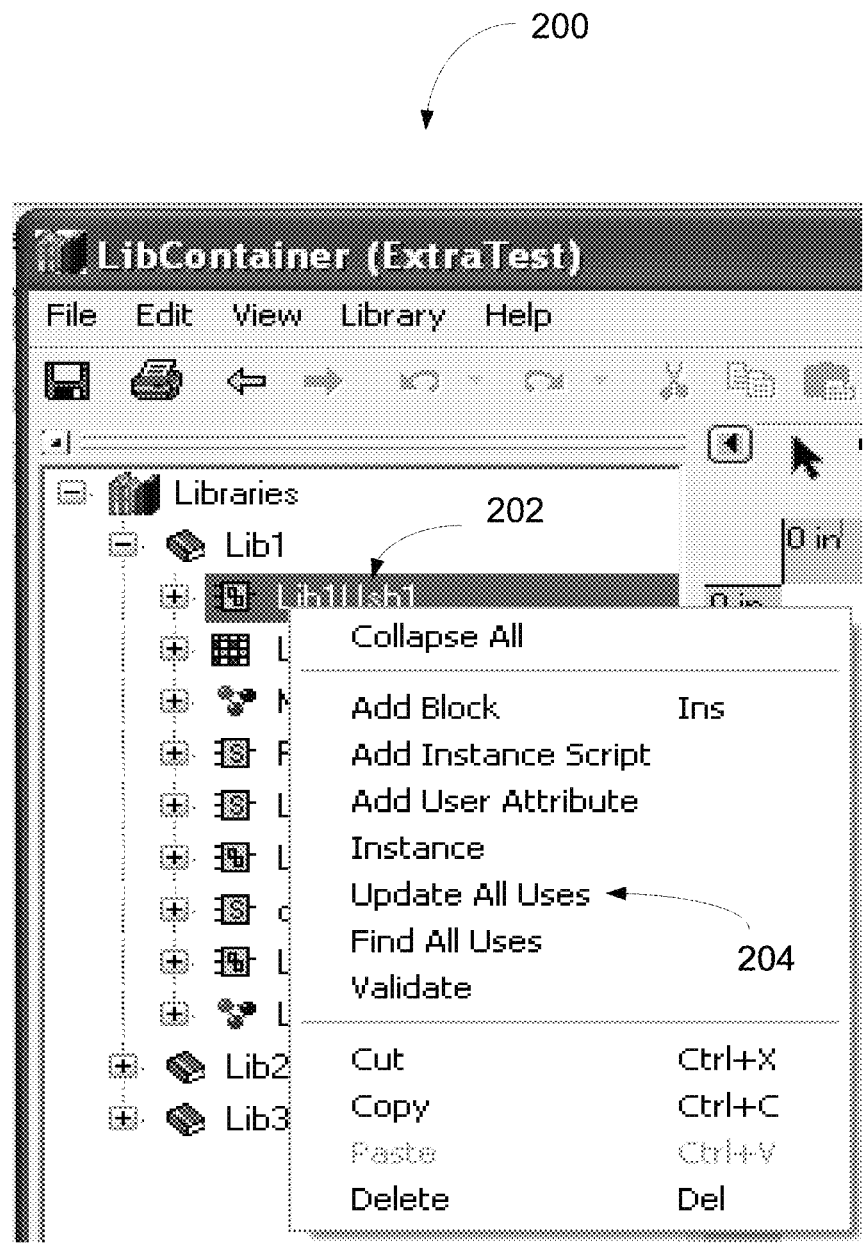
FIG. 2 is an illustrative library container window, according to an example embodiment of the invention.
Figure 3:
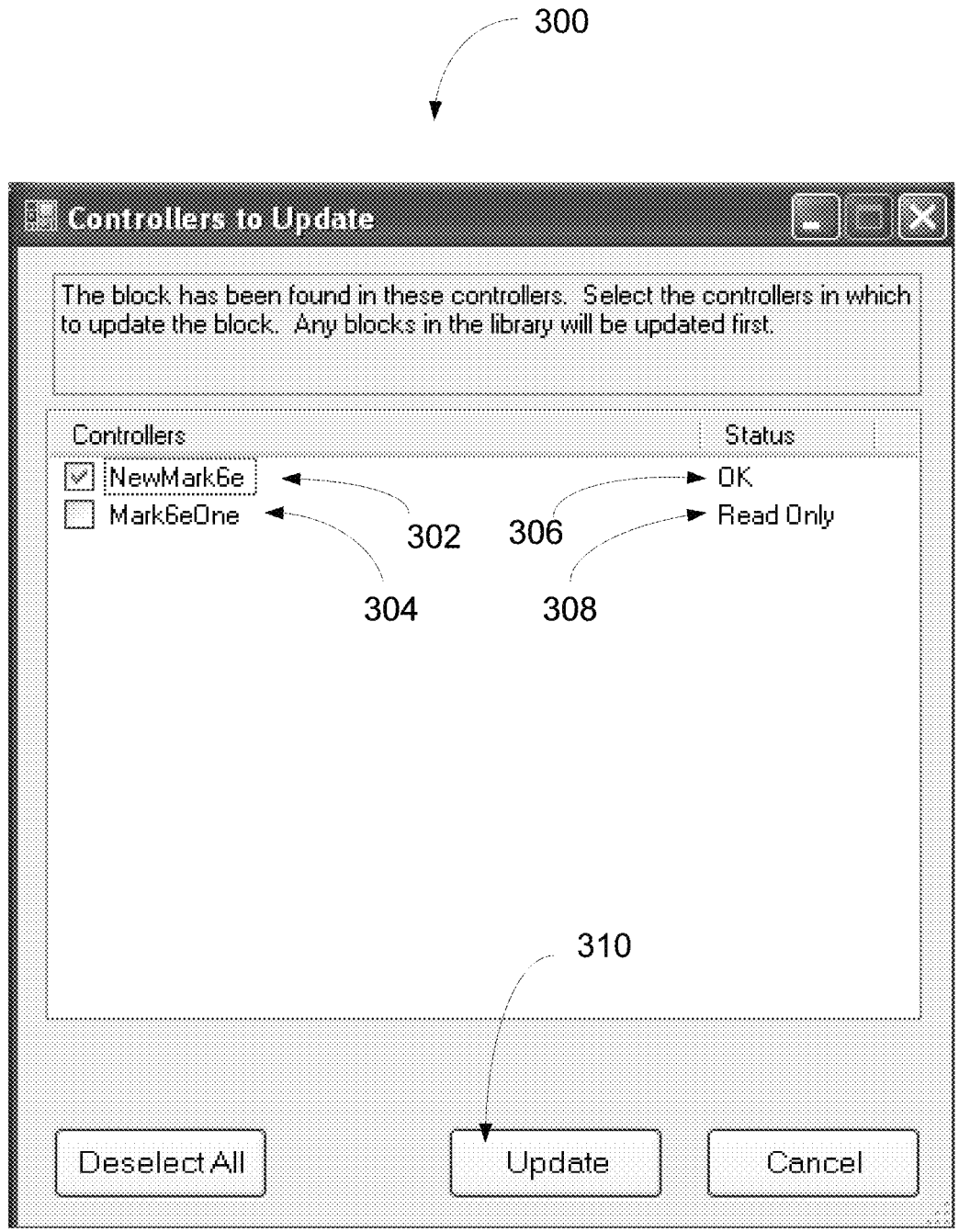
FIG. 3 is an illustrative controller update window, according to an example embodiment of the invention.

FIG. 2 shows an example library container 200 window. According to certain example embodiments of the invention, a user interface, such as 132 in FIG. 1, may be utilized to select the Update All Uses option 204 of a user block item 202 from a context menu. According to an example embodiment of the invention, selecting the Update All Uses option 204 from the context menu may first initiate a check to ensure that the library container is in a saved state. If the library container is in an unsaved state, a dialog may appear warning that the container must be saved. Once the container is in a saved state, the Controllers to Update window 300 may open, as indicated in FIG. 3. According to an example embodiment of the invention, when the Controllers to Update window 300 is initiated, a search may be made to determine which controllers in the system use a particular user block, and the window 300 may be updated when controllers containing linked blocks are found.

Figure 4:
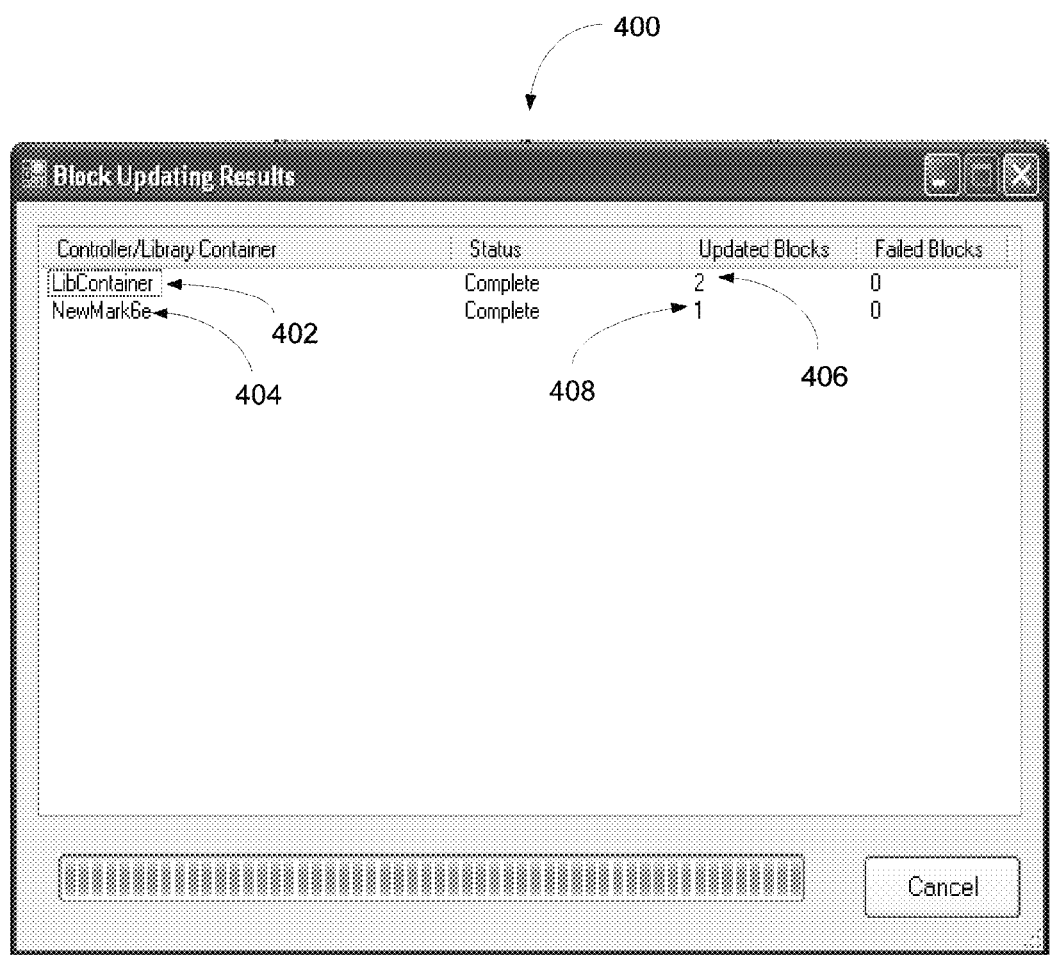
FIG. 4 is an illustrative block update window, according to an example embodiment of the invention.

According to an example embodiment, controllers in the system that utilize a particular user block can be automatically selected 302 or de-selected 304 depending on if the block is password protected, and as indicated by the OK status 306 or read only status 308. In an example embodiment, a particular user block may also be manually selected 302 or de-selected 304 by the user to select controllers for updating. If a controller is found to be in a read-only state 308, the user is warned in the status column of the window 300. According to an example embodiment, when the search for controllers containing the block of code is completed, the Update button 310 may be displayed. Upon selecting the Update button 310, and according to an example embodiment of the invention, a Block Update window 400 may open, as indicated in FIG. 4. In an example embodiment of the invention the library 402 may first be updated, then any controller 404 previously selected (as in 302 of FIG. 3) may be updated. In accordance with an example embodiment, the user may cancel the search and/or update operation at any time. As indicated in FIG. 4, the updated blocks column in the window 400 shows the number of library blocks updated 406 and the number of controller blocks updated 408.

Figure 5:
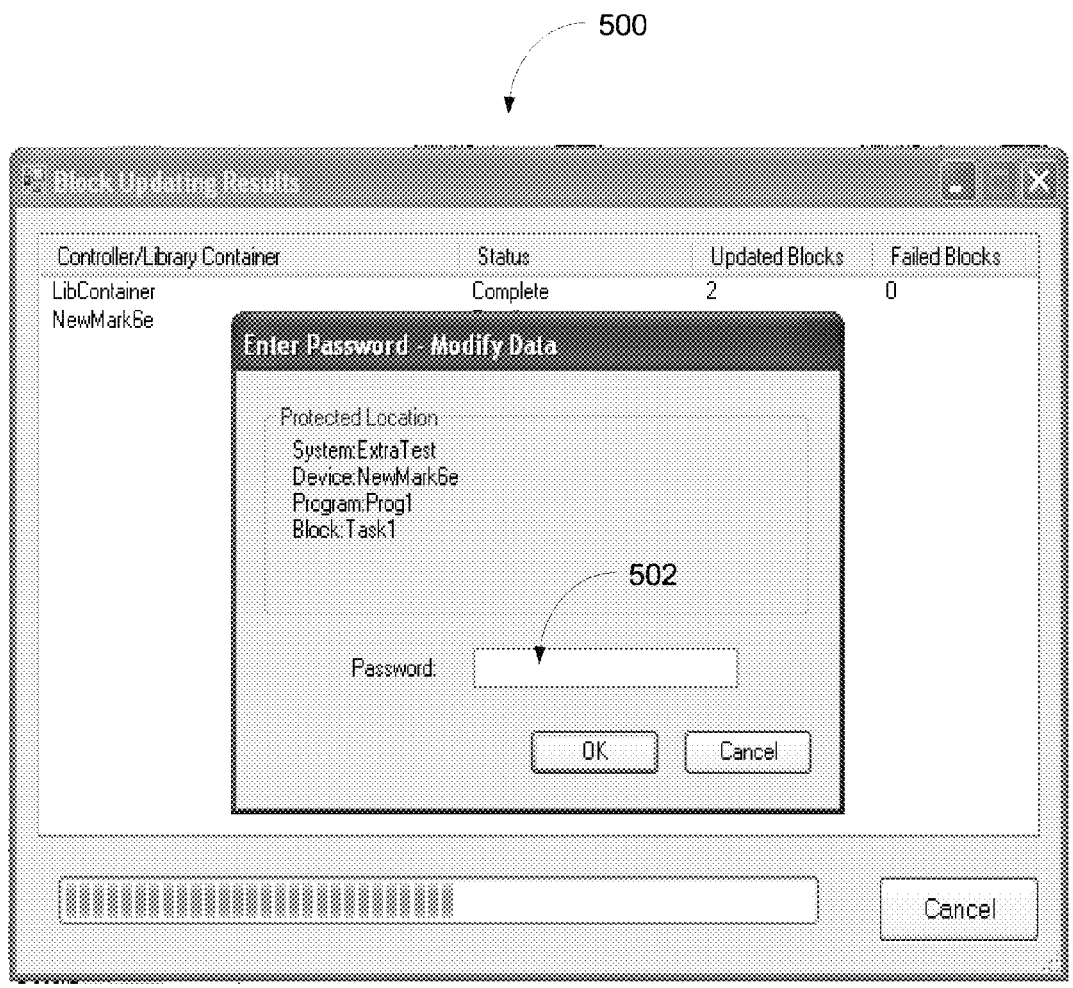
FIG. 5 is an illustrative password protection window, according to an example embodiment of the invention.

According to an example embodiment, when the system attempts to update a password-protected block in a controller, the system may respond with password security challenges for the user. An example password protection window 500 is shown in FIG. 5, where a password entry 502 may be required to update the particular block for a particular controller. In an example embodiment, before allowing new password challenges, the system may attempt to use previously entered passwords to satisfy the challenge. In an example embodiment, if a user cancels a password challenge, the system may skip that current block and may proceed to the next block. In an example embodiment, the number blocks that failed instancing due to cancelling security challenges may be indicated along with a count of successes.

Figure 6:
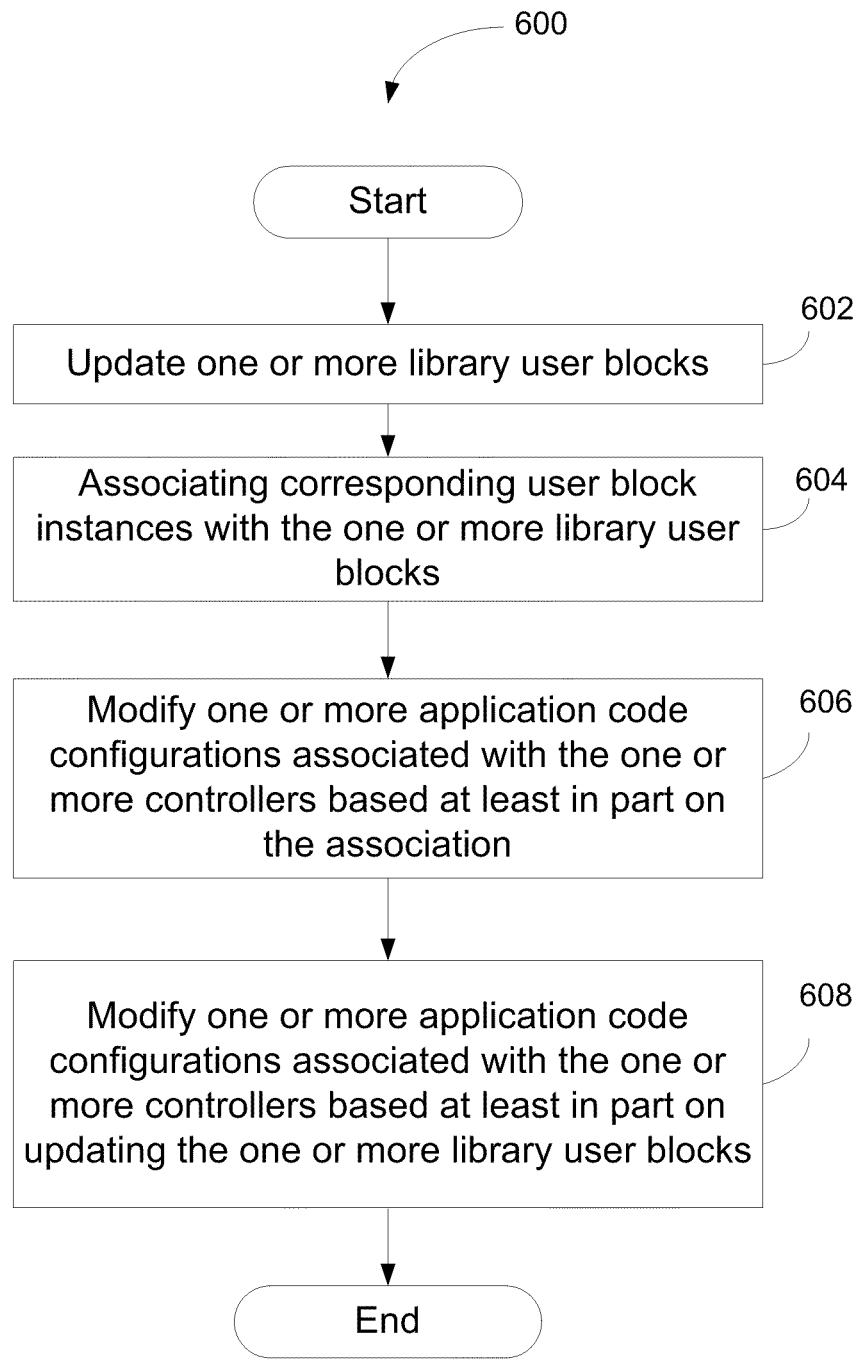
FIG. 6 is a flow diagram of an example method according to an example embodiment of the invention.

An example method 600 for updating configurations associated with one or more controllers will now be described with reference to the flowchart of FIG. 6. The method 600 starts in block 602 where the method includes updating one or more library user blocks. In block 604, the method 600 includes associating corresponding user block instances with the one or more library user blocks. In block 606, the method 600 may include modifying one or more application code configurations associated with the one or more controllers based at least in part on the association. In certain example embodiments of the invention, and as indicated in block 608, the method 600 may include modifying the one or more application code configurations associated with the one or more controllers based at least in part on updating the one or more library user blocks. The method 600 ends after block 608.

According to example embodiments of the invention, after updating one or more library user blocks, one or more application code configurations may be modified by updating at least one configuration file in response to updating the one or more library user blocks. In certain example embodiments of the invention, application code configurations may be modified based on a selection of target controllers. In an example embodiment of the invention, modifying the one or more application code configurations may be based on one or more protection parameters. For example, a password may be required to modify certain application code configurations. In certain embodiments, updating the one or more library user blocks may include storing updates to at least one memory.

Accordingly, example embodiments of the invention can provide the technical effects of creating certain systems, methods, and apparatus that reduce the number of steps to update user blocks. Example embodiments of the invention can provide the further technical effects of providing systems, methods, and apparatus for increasing accuracy and efficiency associated with application code changes. Certain embodiments of the invention may provide the further technical effects of allowing users to instance a change in a user block definition directly from the library to all the controllers in one operation.

In example embodiments of the invention, the configuration system 100 may include any number of hardware and/or software applications that are executed to facilitate any of the operations.

In example embodiments, one or more I/O interfaces may facilitate communication between the configuration system 100, and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the configuration system 100. The one or more I/O interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the configuration system 100 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ enabled network, a Wi-Fi™ enabled network, a satellite-based network, any wired network, any wireless network, etc., for communication with external devices and/or systems.

As desired, embodiments of the invention may include the configuration system 100 with more or less of the components illustrated in FIG. 1. Furthermore, embodiments of the invention may include the user interface windows 200, 300, 400, 500, 600 with more or less of the features illustrated in FIG. 2, 3, 4, 5 or 6.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A computer-implemented method for updating configurations associated with one or more controllers, the method comprising:

updating one or more library user blocks;

identifying one or more computer processors using one or more user block instances associated with the one or more library user blocks;

identifying, based on input received from a user, a selected group of one or more target computer processors, wherein the selected group of one or more target computer processors comprises a subset of the one or more computer processors;

identifying one or more protection parameters, wherein the one or more protection parameters comprises at least a password to enable simultaneous modification of source code corresponding to the one or more user block instances for the selected group of one or more target computer processors; and selectively modifying the source code for the selected group of one or more target computer processors based at least in part on the updating of the one or more library user blocks and the at least one password.

2. The method of claim 1, wherein selectively modifying the source code is further based on updating the one or more library user blocks.

3. The method of claim 1, wherein selectively modifying the source code comprises updating at least one configuration file in response to updating the one or more library user blocks.

4. The method of claim 1, wherein selectively modifying the source code is further based on identifying one or more other linked blocks.

5. The method of claim 1, wherein updating the one or more library user blocks comprises storing updates to at least one memory.

6. A system for updating configurations comprising:
   one or more computer processors;
   at least one memory for storing data and computer-executable instructions; and
   at least one controller configured to execute the stored computer-executable instructions for:
      updating one or more library user blocks;
      identifying one or more computer processors using one or more user block instances associated with the one or more library user blocks;
      identifying, based on input received from a user, a selected group of one or more target computer processors, wherein the selected group of one or more target computer processors controllers comprises a subset of the one or more computer processors;
      identifying one or more protection parameters, wherein the one or more protection parameters comprises at least a password to enable simultaneous modification of source code corresponding to the one or more user block instances for the selected group of one or more target computer processors; and
      selectively modifying the source code for the selected group of one or more target computer processors based at least in part on the updating of the one or more library user blocks and the at least one password.

7. The system of claim 6, wherein selectively modifying the source code comprises updating at least one configuration file associated with one or more computer processors in response to updating the one or more library user blocks.

8. The system of claim 6, wherein selectively modifying the source code is further based on identifying one or more other linked blocks associated with the one or more computer processors.

9. The system of claim 6, wherein updating the one or more library user blocks comprises storing updates to at least one memory associated with the one or more computer processors.

10. An apparatus for updating configurations associated with one or more computer processors comprising:
    at least one memory for storing computer-executable instructions; and
    at least one processor configured to access the at least one memory and further configured to execute the computer-executable instructions for:
       updating one or more library user blocks;
       identifying one or more computer processors using one or more user block instances associated with the one or more library user blocks;
       identifying, based on input received from a user, a selected group of one or more target computer processors, wherein the selected group of one or more target computer processors comprises a subset of the one or more computer processors;
       identifying one or more protection parameters, wherein the one or more protection parameters comprises at least a password to enable simultaneous modification of source code corresponding to the one or more user block instances for the selected group of one or more target computer processors; and
       selectively modifying the source code for the selected group of one or more target computer processors based at least in part on updating the one or more library user blocks and the one or more identified protection parameters.

11. The apparatus of claim 10, wherein selectively modifying the source code comprises updating at least one configuration file associated with one or more computer processors in response to updating the one or more library user blocks.

12. The apparatus of claim 10, wherein updating the one or more library user blocks comprises storing updates to at least one memory associated with the one or more processors.

* * * * *

UNITED STATES PATENT AND TRADEMARK OFFICE
CERTIFICATE OF CORRECTION

PATENT NO.       : 9,110,690 B2                                                Page 1 of 1
APPLICATION NO.  : 12/769159
DATED            : August 18, 2015
INVENTOR(S)      : Kreft et al.

It is certified that error appears in the above-identified patent and that said Letters Patent is hereby corrected as shown below:

In the claims

Column 7, Line 23, Claim 6, delete "processors controllers comprises" and insert -- processors comprises --, therefor.

Signed and Sealed this
Twenty-second Day of March, 2016

Michelle K. Lee
*Director of the United States Patent and Trademark Office*